United States Patent [19]

Hirano

[11] Patent Number: 4,897,644
[45] Date of Patent: Jan. 30, 1990

[54] RADIO-WAVE TRANSMISSION SYSTEM OF KEYLESS ENTRY SYSTEM FOR AUTOMOTIVE VEHICLE DEVICES

[75] Inventor: Motoki Hirano, Yokohama, Japan

[73] Assignee: Nissan Motor Company, Limited, Yokohama, Japan

[21] Appl. No.: 94,073

[22] Filed: Sep. 3, 1987

Related U.S. Application Data

[63] Continuation of Ser. No. 651,784, Sep. 18, 1984, abandoned.

[30] Foreign Application Priority Data

Sep. 19, 1983 [JP] Japan ................. 58-172683

[51] Int. Cl.$^4$ ............................................. G06F 7/04
[52] U.S. Cl. ...................... 340/825.310; 340/825.690; 180/287; 70/257; 307/10.2
[58] Field of Search ........... 340/825.3, 825.32, 825.54, 340/825.69, 825.76, 52 D, 63-65, 528, 542, 572, 825.31, 825.72, 543, 426; 307/10 AT, 10.2; 180/287; 70/252, 256, 257, 278; 455/277; 361/172; 343/711, 713

[56] References Cited

U.S. PATENT DOCUMENTS

| | | | |
|---|---|---|---|
| 3,196,440 | 7/1965 | Weinstein | 340/825.72 |
| 3,670,275 | 6/1972 | Kalliomaki et al. | 455/277 |
| 3,703,714 | 11/1972 | Andrews | 340/63 |
| 3,723,967 | 3/1973 | Atkins et al. | 340/64 |
| 3,866,168 | 2/1975 | McGuirk, Jr. | 307/10 AT |
| 3,891,980 | 6/1975 | Lewis et al. | 340/572 |
| 4,137,985 | 2/1979 | Winchell | 70/252 |
| 4,205,325 | 5/1980 | Haygood et al. | 340/825.32 |
| 4,236,594 | 12/1980 | Ramsperger | 307/10 AT |
| 4,383,242 | 5/1983 | Sassover et al. | 340/825.32 |
| 4,714,343 | 9/1984 | Lemelson | 307/10 AT |
| 4,719,460 | 1/1988 | Takeuchi et al. | 340/825.54 |

FOREIGN PATENT DOCUMENTS

| | | |
|---|---|---|
| 0154306 | 9/1985 | European Pat. Off. |
| 0158354 | 10/1985 | European Pat. Off. |
| 4842414 | 9/1946 | Japan . |
| 48-55609 | 4/1973 | Japan . |
| 53-97718 | 8/1977 | Japan . |
| 2051442 | 1/1981 | United Kingdom . |

OTHER PUBLICATIONS

IBM Technical Disclosure Bulletin, vol. 14, No. 12, May 1972, pp. 3860-3861.

*Primary Examiner*—Donald J. Yusko
*Assistant Examiner*—Edwin C. Holloway, III
*Attorney, Agent, or Firm*—Foley & Lardner, Schwartz, Jeffery, Schwaab, Mack, Blumenthal & Evans

[57] ABSTRACT

A keyless entry system allows operation of door locks, a trunk lid lock, a glove box lid lock, a steering lock device or so forth without mechanical keys. The keyless entry system includes electrically disconnected transmitter and a controller. The controller is connected to operate the devices. The transmitter is adapted to send a present code-indicative radio signal to the controller, which then compares the code contained in the radio signal from the transmitter with a preset code. The controller is provided with a dual-antenna system which ensures clear data transmission between the transmitter and the controller. The dual-antenna system includes at least a pair of antennas oriented essentially perpendicular to each other.

6 Claims, 7 Drawing Sheets

RADIO-WAVE TRANSMISSION SYSTEM OF KEYLESS ENTRY SYSTEM FOR AUTOMOTIVE VEHICLE DEVICES

This application is a continuation of application Ser. No. 651,784, filed Sept. 18, 1984, now abandoned.

BACKGROUND OF THE INVENTION

The present invention relates generally to a keyless entry system for operating automotive vehicle devices, such as door locks, a trunk lid lock, a glove box lid lock, a steering lock device, a starter motor, etc. without mechanical keys. More particularly, the invention relates to a keyless entry system which employ radio waves carrying a preset code.

Conventionally, automotive door locks, trunk lid locks, glove box locks, steering lock devices and so forth in automotive vehicles have been operated by means of ignition or other keys in the past. Recently however, so-called "Keyless Entry Systems", which do not require keys to operate a door locks, a trunk locks, vehicle windows and so forth, have been developed. In the keyless entry system, a keyboard is provided on the external surface of the vehicle body to allow entry of a predetermined code authorizing access to one or more desired vehicle devices. The designated vehicle devices are electrically operated when the entered code matches a predetermined code.

Although such keyless entry systems have been well developed and considered useful because they do not require mechanical keys, a serious problem may occur when the user of the vehicle forgets the predetermined code. If the user is outside of the vehicle and the vehicle door lock device is holding the door locked, the user cannot unlock the door locks until he remembers the predetermined code.

The present invention provides a novel and more useful system for operating the vehicle devices without an ignition key and without requiring manual entry of a predetermined code.

SUMMARY OF THE INVENTION

In order to resolve the aforementioned drawback in the conventional keyless entry system, the applicants hereby propose a unique and novel system in which the user is free from memory of the preset code. According to the present invention, the preset code is entered through a portable transmitter which can be handcarried or carried in a pocket and is adapted to produce a radio transmission carrying the preset code. The keyless entry system according to the invention is therefore provided with a data transfer or transmission system through which code data is transferred.

On the other hand, in order to conserve the electric power of a battery enclosed in the transmitter and a vehicle battery which is utilized as a power source for a controller for operating the vehicle devices in response to entry of the preset code from the transmitter, data transmission between the transmitter and the controller is carried out by way of electromagnetic induction. Response characteristics to the data transmission tend to be affected by directionality of antennas provided for the transmitter and the controller. Ensuring good response characteristics is therefore important to the reliability of the keyless entry system of the present invention.

It is an primary object of the present invention to provide a keyless entry system for an automotive vehicle devices, which allows one-touch operation of desired vehicle devices without manually entering preset code.

Another and more specific object of the present invention is to provide a radio-wave transmission system for transmitting preset code data between two electrically disconnected components of the keyless entry system, which radio-wave transmission system performs satisfactorily efficient in data transmission.

In order to accomplish the above-mentioned and other objects, a keyless entry system for automotive vehicle devices according to the present invention comprises a wireless code transmitter which is portable by hand or in pockets, and a controller connected to vehicle devices to electrically operate the latter in response to a preset code transmitted from the transmitter. The transmitter transmits a code signal to the controller when one of the vehicle devices is to be operated. The controller is responsive to the code signal when the transmitted code matches a preset code to produce a driver signal which actuates the designated vehicle device.

In the preferred structure, a switch which activates a transmitter is provided on the external surface of the vehicle body and connected to the controller. When the switch is thrown, the controller transmits a demand signal to the transmitter possessed by the user. The transmitter responds to the demand signal by transmitting the code signal to the controller.

On another preferred structure, a dual antenna system is provided for assuring transmission of data between the transmitter and the controller.

In accordance with one aspect of the invention, a keyless entry system for an automotive vehicle devices comprises an electrical actuator associated with the lock device and responsive a control signal to reverse the position of the lock device, a manual switch manually operable to activate the actuator, a transmitter responsive to operation of the manual switch to output a radio signal indicative of a unique code which identifies the transmitter, a controller for receiving the radio signal from the transmitter, comparing the unique code indicated by the radio signal with a preset code, and producing the control signal when the unique code matches the preset code, and a disabling means connected to the controller for detecting a predetermined disabling condition and disabling the controller when the predetermined disabling condition is detected.

According to another aspect of the invention, a keyless entry system for an automotive vehicle for operating one of a plurality of vehicle devices including a door lock device which is selective operated to either of a first locked position and a second unlocked position, comprises a plurality of electrical actuators respectively associated with the corresponding vehicle devices and responsive a control signal to operate the corresponding vehicle device to desired position, a plurality of manual switches, each adapted to be operated for operating one of the corresponding vehicle devices, a transmitter activated by manual operation of one of the manual switches to output a radio signal indicative of a unique code which identifies the transmitter, a first antenna associated with the transmitter for transmitting the radio signal therethrough, a controller for receiving the ratio signal from the transmitter, comparing the unique code indicated by the radio signal with a preset code, and producing the control signal when the unique code matches the preset code, the controller including means responsive to manual operation of one of the manual switch for identifying one of the actuators to be operated and operating the identified actuator for operating one of the vehicle devices corresponding to the manual switch operated and a plurality sets of second and third antennas, each set connected to the controller for receiving the radio signal therethrough and adapted to be active when one of the manual switch corresponding thereto is operated, the each set of second and third antennas being oriented perpendicular to each other.

BRIEF DESCRIPTION OF THE DRAWINGS

The present invention will be understood more fully from the detailed description given here below and from the accompanying drawings of the preferred embodiment of the present invention, which, however, should not be assumed to limit the invention to the specific embodiments but are for explanation and understanding only.

In the drawings.

DESCRIPTION OF THE PREFERRED EMBODIMENT

Figure 1:
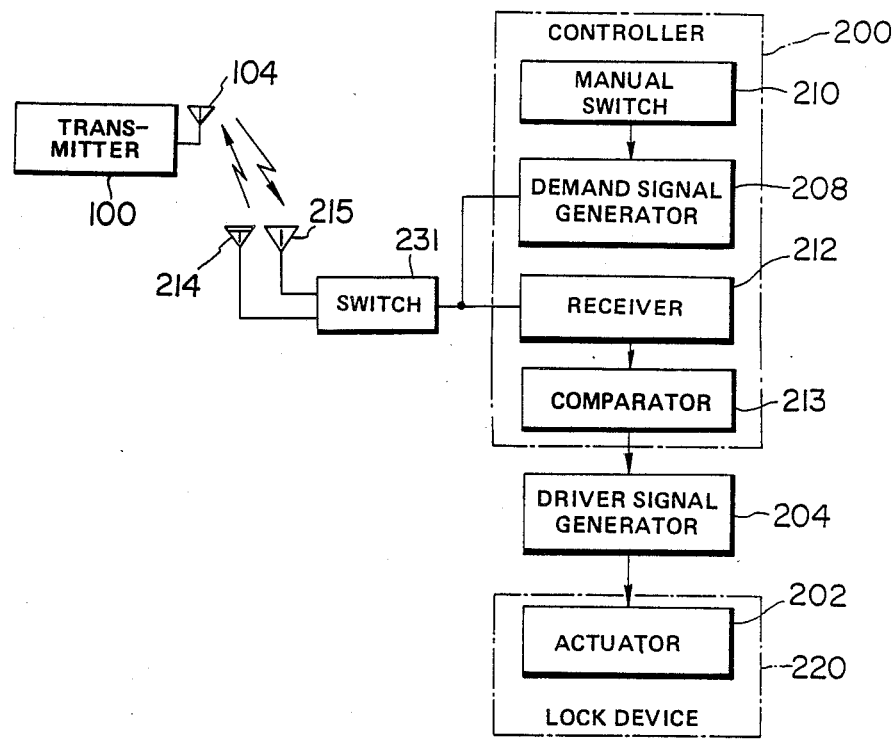
FIG. 1 is a schematic block diagram showing the general concepts of a keyless entry system for an automotive vehicle device according to the present invention.
Figure 2:
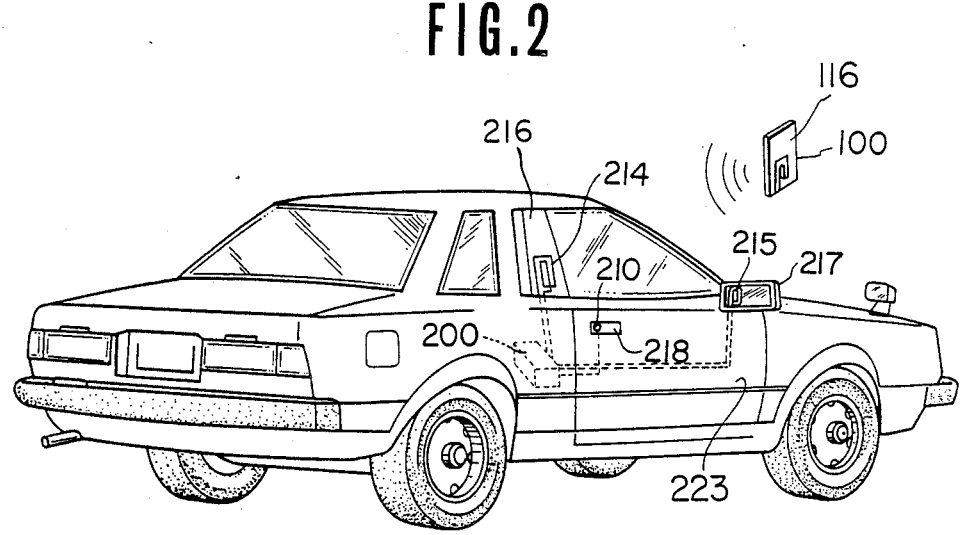
FIG. 2 is a perspective view of an automotive vehicle to which the keyless entry system according to the present invention is applied.

Referring now to the drawings, particularly to FIGS. 1 and 2, the first embodiment of a keyless entry system for an automotive vehicle according to the present invention generally comprises a code transmitter 100 and a controller 200. The controller 200 is connected via a driver signal generator 204 to actuators 202 for vehicle devices such as door lock device, a trunk lid lock device, a glove box lid locks and a steering lock device.

The transmitter 100 is provided with an antenna 104 which is built into a transmitter casing 116. The antenna 104 is a loop antenna. In addition, the controller 200 is provided with a pair of loop antennas 214 and 215. The antennas 214 and 215 are provided on surfaces lying essentially perpendicular to each other. In the embodiment shown, the antenna 214 is mounted on a vehicle side-window at a position near an outside door handle 217 which is mounted on a vehicle door 217 by means of an outside door handle escutcheon 218. The outside door handle escutcheon 218 also supports one or more manually operable push-button switches 210. The antenna 215 is mounted on a door mirror 217 mounted at the forward corner of the front side-door 223. The mirror surface of the door mirror 217 lies essentially perpendicular to the surface of the side-window.

The antennas 214 and 215 are connected to the controller circuit through a switching circuit 231 which alternatingly and selectively connects one of the antennas 214 and 215 to the controller circuit.

The controller 200 includes a demand signal SD generator 208 which sends a demand signal SD to the transmitter 100 to activate the latter. The demand signal SD generator 208 is connected to the manual switches 210. The demand signal SD generator 208 produces a demand signal SD when one of the manual switches 210 is depressed.

Figure 3:
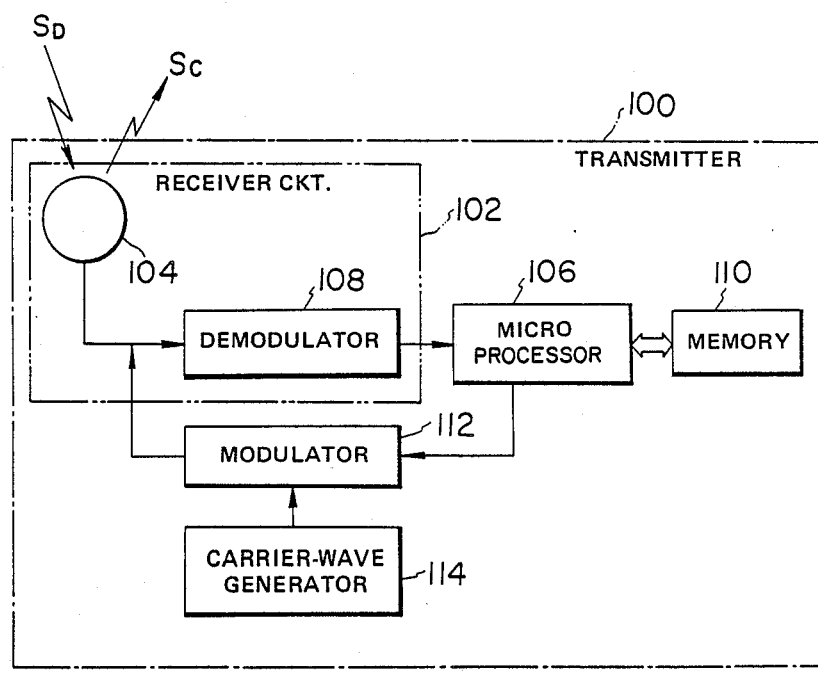
FIG. 3 is a block diagram of a transmitter in the first embodiment of a keyless entry system according to the present invention.

As shown in FIG. 3, the transmitter 100 includes a receiver circuit 102 for receiving the demand signal SD from the controller. The transmitter 100 becomes active when the receiving circuit 102 receives the demand signal SD to produce a code signal SC which is indicative of a preset specific code. The preset code of the portable transmitter 100 differs from that of the demand signal SD generator 208 so that the controller 200 can recognize when the transmitter 100 is responding.

The transmitter 100 continuously transmits the code signal SC to the controller for as long as it remains active. The code signal SC is received by a receiver 212 in the controller 200. The controller 200 has a comparator 213 to compare the received code with a specific preset code. When the received code matches the code preset as compared in the comparator 213, the controller 200 sends a control signal SL to the driver signal generator 204. The driver signal generator 204 in turn sends a drive signal to one of the actuators 202 corresponding to the manual switch 210 operated. The actuator 202 in activated by the driver signal from the driver signal generator 204 to operate the corresponding vehicle device.

Figure 6:
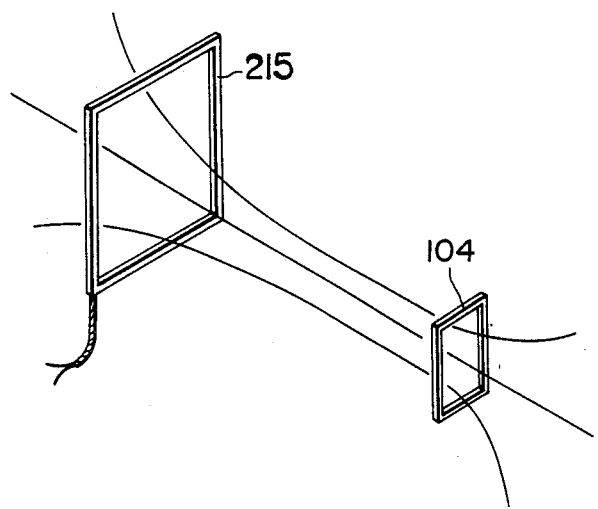
FIGS. 6 and 7 illustrate, respectively, a parallel and perpendicular arrangement of transmitter and controller antennas for teaching the principles of the invention.
Figure 7:
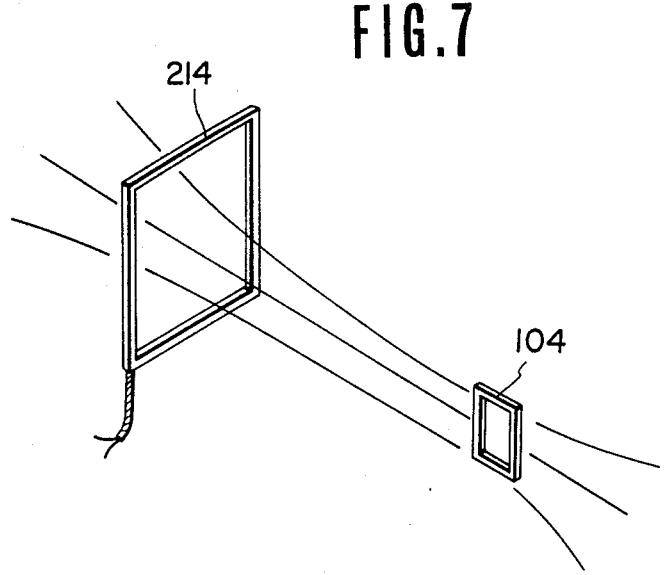

Transmission of the demand signal SD and the code signal SC is performed by way of electromagnetic induction between the antennas 104 and 214 or 104 and 215. The strength of the electromagnetic induction depends on the orientation of the active antenna 214 or 215 relative to the antenna 104 of the transmitter. For instance, when the antenna 104 of the transmitter 100 is approximately perpendicular to the antenna 214 as shown in FIG. 7, the strength of the transmitted demand signal SD or code signal SC is rather low and possibly too low to be received. On the other hand, as shown in FIG. 6, when the antenna 104 lies approximately parallel to the antenna 215, relatively strong electromagnetic induction will occur between the antennas, ensuring satisfactory transmission of code data. Therefore, by selectively activating the more nearly parallel of the antennas 214 and 215, reception of the code data can be assured.

It should be appreciated that, since the vehicle devices to be operated by the first embodiment of the keyless entry system are two-state locking devices for locking and unlocking vehicle doors, the trunk lid, glove box lid, the steering column and so forth, the actuators 202 actuate the vehicle devices from the current position to the opposite position in response to the driver signal. For instance, when the vehicle device is in the locked position, the actuator unlocks the vehicle device in response to the driver signal. On the other hand, when the driver signal is sent to the actuator of a vehicle device which currently unlocked, that vehicle device is then locked.

The transmitter 100 includes a transmitter/receiver antenna 104. In addition, a loop antenna 214 is built into one of the windows 216 of the vehicle. The loop antenna 214 transmits the demand signal SD to and receives the code signal SC from the transmitter 100. As shown in FIG. 2, the manual switches 210 are mounted on an escutcheon 218 of an outside door handle for operation from outside the vehicle.

The transmitter 100 is housed in a case small enough to hand-carry or to pocket.

FIG. 3 shows the circuit structure of the transmitter 100. A microprocessor 106 is connected to the antenna 104 via a demodulator 108 which demodulates the received demand signal SD. The microprocessor 106 includes a memory 110 storing the preset code. In response to the demand signal SD, the microprocessor 106 reads out the preset code to a modulator 112. The modulator 112 is, in turn, connected to a carrier-wave generator 114 to receive a carrier wave. The modulator 112 modulates the carrier-wave with the code-indicative signal from the microprocessor 106 to produce the final code signal SC.

In the preferred embodiment, the antenna 104 of the transmitter 100 is built into the transmitter circuit board or on the surface of the transmitter casing 116 (shown in FIG. 2). The casing 116 is the size of a name card and thin enough to carry in a shirt pocket. The transmitter 100 uses a long-life, compact battery, such as a mercury battery, as a power source.

Figure 4:
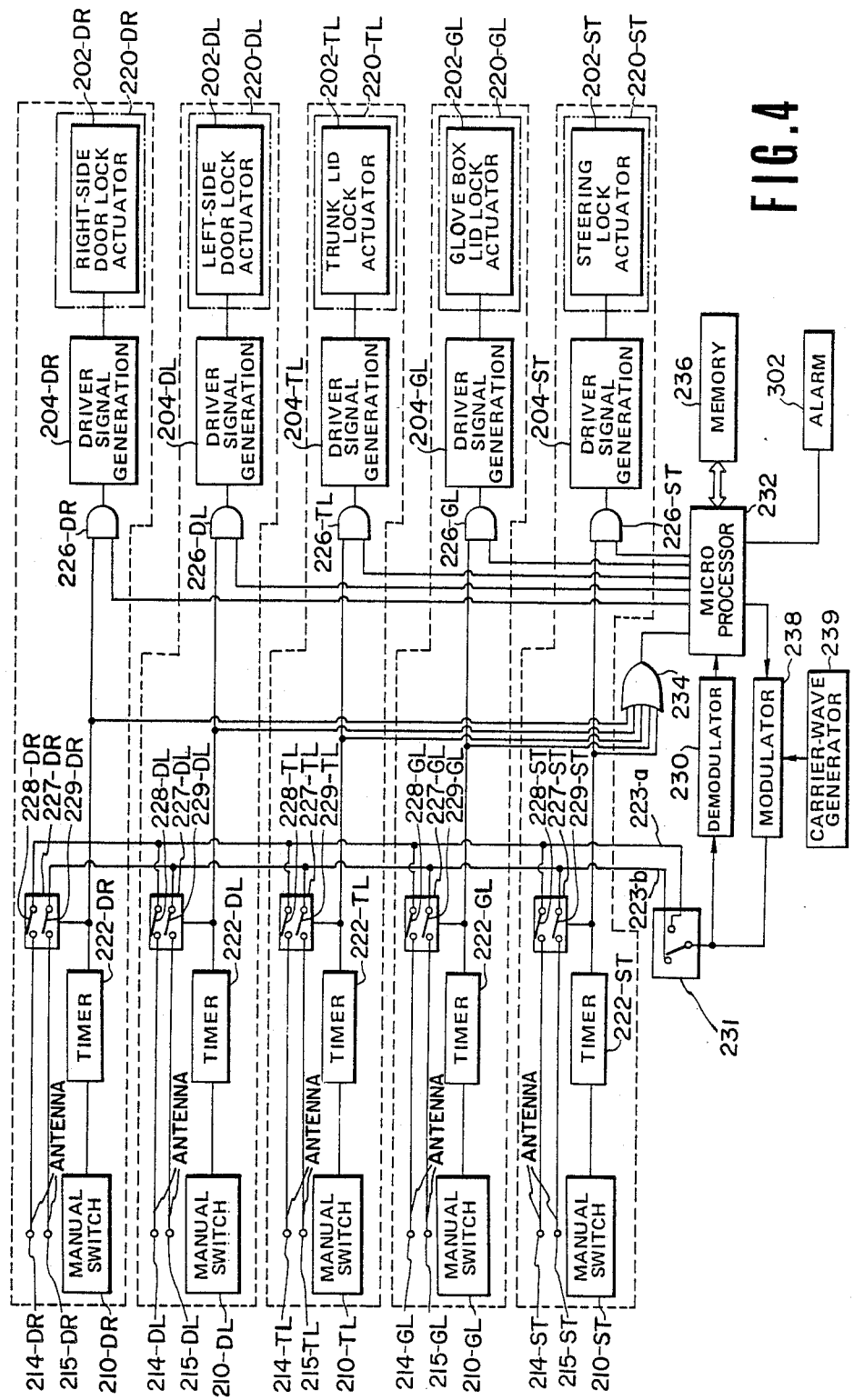
FIG. 4 is a block diagram of a controller in the first embodiment of the keyless entry system according to the present invention.

FIG. 4 shows the circuitry of the controller 200. As set forth above, the shown embodiment of the keyless entry system is adapted to operate the door locks, the trunk lid lock, the glove box lock and the steering lock device. In addition, the shown embodiment is adapted to control operation of the locks for the right- and left-side doors independently. In order to allow independent operation of the lock devices, manual switches 210-DR, 210-DL, 210-TL, 210-GL and 210-ST are provided on the vehicle body somewhere nearby the devices to be operated. For example, the manual switches 210-DR and 210-DL are provided adjacent the door handles of respectively corresponding side doors. Similar, the manual switch 210-TL to operate the trunk lid lock device would be placed adjacent the trunk lid.

Though the specific embodiment has been illustrated to locate respective manual switches adjacent the corresponding vehicle devices to be operated, it would be possible to provide all of manual switched in concentric manner on the outside door handle escutcheon 218, for example.

Each manual switch is operable independently to operate the corresponding lock device. For example, when the manual switch 210-DR is depressed, the right-side door lock 220-DR is actuated to either to the locked or unlocked state.

Each manual switch 210-DR, 210-DL, 210-TL, 210-GL and 210-ST is connected to a timer 222-DR, 222-DL, 222-TL, 222-GL and 222-ST through a normally closed relay (now shown). The timers, which will be referred to generically with reference numeral "222", are responsive to depression of the corresponding manual switch, which will be referred to generically with reference numeral "210", to produce a HIGH-level timer signal St for a given period of time. This given period of time should be long enough to cover the time required to transmit the demand signal SD from the controller to the transmitter 100 and to receive the code signal SC from the transmitter in return. The timer signal St is fed to a corresponding AND-gate 226-DR, 226-DL, 226-TL, 226-GL and 226-ST, which will be referred to generically with reference numeral "226". At the same time, the timer signal St is fed to a corresponding switching circuit 227-DR, 227-DL, 227-TL, 227-GL and 227-ST, which will be referred to generically with reference numeral "227". Each switching circuit 227-DR, 227-DL, 227-TL, 227-GL and 227-ST includes a pair of switching elements 228-DR, 228-DL, 228-TL, 228-GL or 228-ST which will be referred to generally with reference numeral "228", and 229-DR, 229-DL, 229-TL, 229-GL and 229-ST which will be referred to generally with reference numeral "229". The switching elements 228-DR, 228-DL, 228-TL, 228-GL or 228-ST are connected the corresponding antenna 214-DR, 214-DL, 214-TL, 214-GL or 214-ST, which will be referred to generically with reference numeral "214". The switching elements 229-DR, 229-DL, 229-TL, 229-GL or 229-ST are connected the corresponding antenna 215-DR, 215-DL, 215-TL, 215-GL or 215-ST, which will be referred to generically with reference numeral "215".

It should be noted that the antennas 214-DR, 214-DL, 214-TL, 214-GL or 214-ST are located adjacent respectively corresponding vehicle devices to be operated. For example, the antennas 214-DR and 214-DL are mounted on respectively corresponding side windshields, the antenna 214-TL for operating the trunk lid lock device may be provided on the rear windshield or the edge of rear windshield opening, and antennas 214-ST and 214-GL for steering lock device and the glove box lid lock device may be mounted on the front windshield or along the edge of the front windshield opening.

The switching elements 228 closes in response to the timer signal St to connect the corresponding antenna 214-DR, 214-DL, 214-TL, 214-GL or 214-ST, which will be referred to generically with reference numeral "214", to the switching circuit 231 via a conductive line 223a. On the other hand, the switching elements 229 close in response to the timer signal St to connect the corresponding antennas 215-DR, 215-DL, 215-TL, 215-GL and 215-ST to the switching circuit 231 through a conductive line 233b. The switching circuit 231 is, in turn, connected to a demodulator 230 which demodulates the code signal SC to remove the carrier-wave. The switching circuit is also connected to a microprocessor 232 to receive a switching signal Ss in response to which it switches between its first and second switch positions. In the first switch position, the switching circuit 231 connects the conductive line 223a to the demodulator to feed the input code signal SC received by one of the antennas 214 to the demodulator. In the second position, the switching circuit 231 connects the conductive line 223b to the demodulator 230 to feed the input code signal SC received by one of the antennas 215 to the demodulator.

The timers 222 are also all connected to a microprocessor 232 via a multi-input OR gate 234. The microprocessor 232 includes a memory 236 which stores the preset code corresponding to that stored in the transmitter 100.

The microprocessor 232 responds to the timer signal St received via the OR gate 234 by outputting the demand signal SD to the transmitter through a modulator 238 and antenna 214. The modulator 238 is connected to the antennae 214 via the switching circuits 228 to transmit the demand signal SD to the transmitter 100. The microprocessor 232 receives the code signal SC via the antenna 214 and the demodulator 230 and compares the received code with the stored code. When the received code matches the stored code, the microprocessor 232 outputs the control signal SL to the other input terminal of the AND gate 226 corresponding to the depressed manual switch. Therefore, at this time, AND gate 226 transmits a HIGH-level signal to the driver signal generator 204-DR, 204-DL, 204-TL, 204-GL or 204-ST, which will be referred to generically with reference numeral "204". The driver signal generator 204 responds to the HIGH-level signal by outputting a driver signal to the corresponding actuator 202-DR, 202-DL, 202-TL, 202-GL or 202-ST of the lock 220-DR, 220-DL, 220-TL, 220-GL or 220-ST.

The operation of the first embodiment the keyless entry system set forth above will be described in more detail with reference to FIGS. 5(A) and 5(B). The microprocessor 106 of the transmitter 100 repeatedly executes the first control program illustrated in FIG. 5(A). In the first control program, the microprocessor 106 checks for receipt of the demand signal SD from the controller at a step 1002. The step 1002 is repeated until the demand signal SD is received. In other words, the transmitter 100 normally remains in a stand-by state, waiting to produce the code signal SC in response to the demand signal SD.

When the demand signal SD is detected at the step 1002, the preset code is read from the memory 110 at a step 1004. The microprocessor 106 then outputs the code-indicative signal to the modulator 112 which in turn outputs the code signal SC in step 1006. Control then returns to the stand-by step 1002.

It should be noted that the code signal SC is transmitted from the modulator to the controller for a given period of time and terminates when the given period of time expires. The given period of time during which the code signal SC is transmitted is so chosen that the controller 200 can activate the actuator 202 designated by the operated manual switch before expiration of that period. In addition, the code stored in the memory 110 is preferably a binary code, such as an 8-bit serial datum. This binary code rides on the carrier wave as modulated by the modulator to form the code signal SC.

Figure 5:
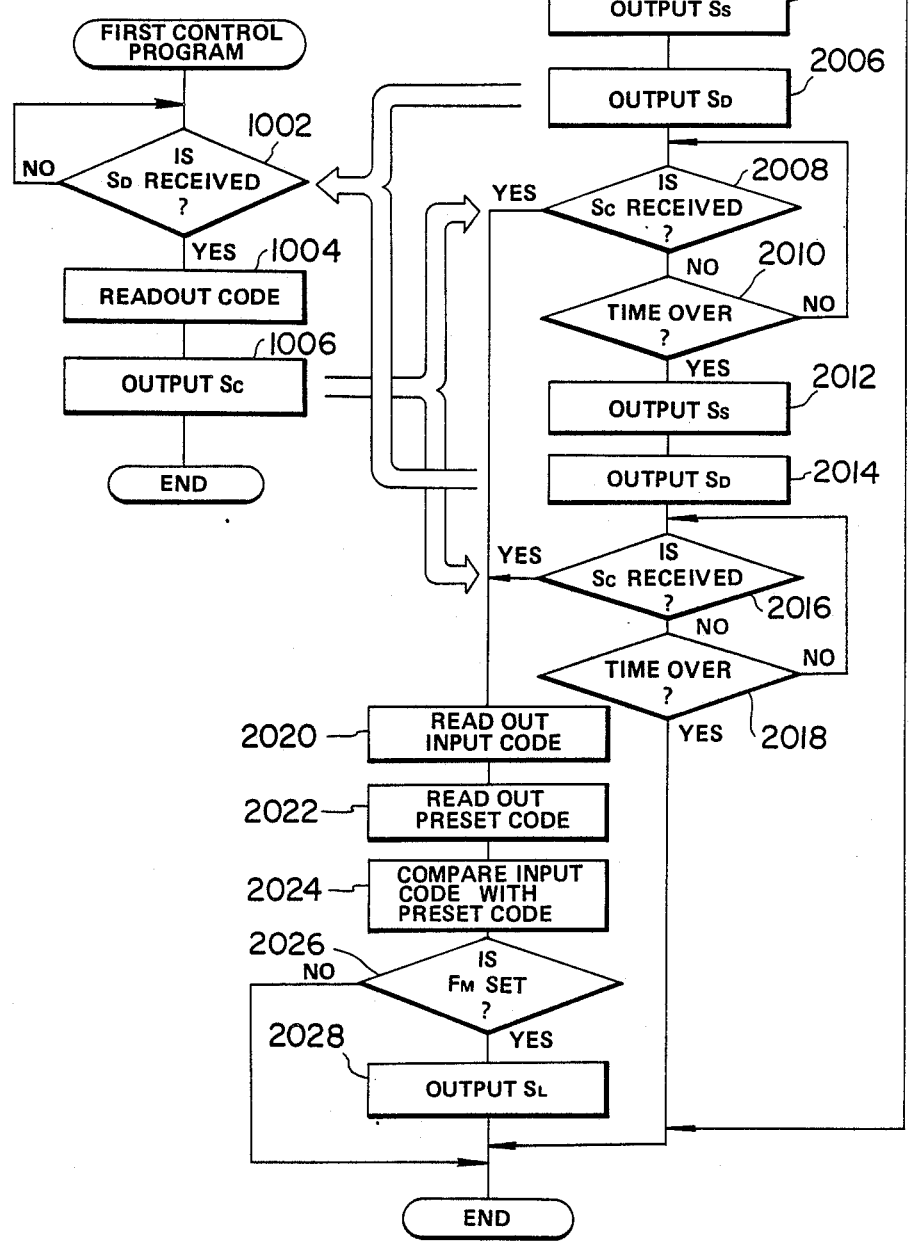
FIGS. 5(A) and 5(B) are flowcharts of the operation of the transmitter and the receiver, respectively.

FIG. 5(B) is a flowchart for the controller. At the initial stage of the second control program of FIG. 5(B), the microprocessor 232 checks for receipt of the timer signal St at a step 2002. If the timer signal St is not detected when checked at the step 2002, the second program ends. This is substantially the same as the loop at the step 1002 in FIG. 5(A) and holds the controller in stand-by until depression of a manual switch. When one of the manual switches 210 is depressed and therefore a timer signal St is sent to the microprocessor 232, the microprocessor 232 sends the switching signal Ss to the switching circuit 231 which then switches between its first and second positions, at a step 2004. Thereafter, after a relatively short delay allowing the switching circuit 231 to switch positions, the demand signal SD is produced and output through the modulator 238 and the selected antenna 214 or 215, at a step 2006. The code signal SC to be produced at the step 1006 of the first program of FIG. 5(A) in response to the demand signal is checked at a step 2008 to see if it has been received. If the code signal has not yet been received when checked at the step 2008, elapsed time is checked at a step 2010.

In practice, a timer included in the microprocessor 232 is activated in response to outputting of the demand signal SD to start measurement of elapsed time. If elapsed time matches or exceeds a given timer threshold, the timer outputs a time-over signal. If the time-over signal is detected when checked at the step 2010, the switching signal Ss is again sent to the switching circuit 231, at a step 2012. Then, at a step 2014, the demand signal is output once again to the transmitter 100 through the modulator 238 and the corresponding one of the antennas 215 or 214. In response to the demand signal SD, the timer 222 is cleared to restart measurement of elapsed time. Receipt of the code signal SC from the transmitter 100 is checked at a step 2016. If the code signal SC is not yet received, elapsed time is again checked at a step 2018. If elapsed time exceeds a predetermined threshold at the step 2016, then the program ends.

On the other hand, if receipt of the code signal SC is confirmed at either of the steps 2008 and 2016, the received code in the code signal SC is read out at a step 2020. The preset code of the controller 200 is then read out from the memory 236, at a step 2022. The input code and the preset code read out in steps 2008 and 2010 are compared at a step 2024. If the codes match, a matching flag FM is set at the step 2024. The matching flag FM is checked at a step 2026. If the matching flag FM is not set, the program ends. On the other hand, if the matching flag FM is set when checked at the step 2026, then the control signal SL is sent to the driver signal generator at a step 2028.

In the first embodiment as set forth above, since the code signal SC is output only when the demand signal SD is input from the controller, consumption of electric power of the battery in the transmitter is significantly reduced in comparison with systems which might employ constant transmission of the code signal SC. Thus, the life-time of the battery of the transmitter is prolonged even though electric power is constantly supplied to the microprocessor to hold same in stand-by. It should be appreciated that the electric power needed to power the microprocessor is substantially smaller than that consumed in transmitting the code signal SC. Therefore, constant power supply to the microprocessor will not significantly affect the life-time of the battery.

Similarly, since the demand signal SD is produced only when at least one of the manual switches is depressed, consumption of the electric power by the controller is significantly limited.

It is also to be noted that transmission of the demand signal SD and the code signal SC is performed by electromagnetic induction. Since locking and unlocking operations of the lock devices will generally be performed only when the transmitter is near the controller, good communication between the transmitter and the controller can be obtained by electromagnetic induction without significant power consumption.

In order to unlock the right-side door lock device 220-DR, the manual switch 210-DR is depressed. When the ignition switch is in the OFF position, the timer 222-DR becomes active to output the timer signal St. The timer signal St is applied to the AND gate 226-DR and to the switching elements 228-DR and 229-DR, the latter of which then closes to connect the antenna 214-DR or 215-DR to the microprocessor 232.

The timer signal St from the timer 222-DR is also input to the microprocessor 232 via the OR gate 234.

The microprocessor 232 responds inputs from the OR gate 234 by activating the modulator 238 to transmit the demand signal SD via the antenna 214-DR or 215-DR.

The demand signal SD transmitted via the antenna 214-DR is received by the antenna 104 of the transmitter 100. Then, the demand signal SD is demodulated by the demodulator 108 to remove the carrier-wave components. The microprocessor 106 of the transmitter 100 then executes the steps 1004 and 1006 of the first control program of FIG. 5(A) and outputs the code-indicative signal to the modulator 112. The modulator 112 thus transmits the code signal SC to the controller 200 via the antenna 104.

Here, assuming the switching circuit 231 is in its first switch position as a result of the first issued switching signal Ss and the antenna 104 of the transmitter 100 is oriented essentially perpendicular to the antenna 214-DR, as shown in FIG. 7, the response of the antenna 214-DR is apt to be too weak to satisfactory receive the code signal. If receipt of the code signal SC from the transmitter 100 is not confirmed within the given period of time, the switching signal Ss is output once again to switch the switching circuit 231 to its second position. Since in this case, the antenna 215-DR is aligned essentially parallel to the antenna 104, as shown in FIG. 6, good response characteristics can be achieved. Therefore, in the above case, the code signal SC will be transferred to the demodulator 230 through the antenna 215-DR via the conductive line 233b.

The code signal SC is received by the antenna 215-DR and fed to the demodulator 230. The demodulator 230 demodulates the code signal SC to remove the carrier-wave components. The microprocessor 232 receives the demodulated code signal SC and executes the steps 2008 to 2016 of the second control program. When the input code matches the preset code in the memory 236, the microprocessor 232 feeds the control signal SL to the AND gate 226-DR. At this time, since the timer signal St is still being applied to one of the input terminals of the AND gate 226-DR, the AND condition of the timer signal St and the control signal SL is established and, as a result, the AND gate 226-DR passes a HIGH-level signal to the driver signal generator 204-DR which produces the driver signal. The driver signal is applied to the actuator 202-DR of the right-side door lock device 220-DR to reverse the lock position. Since the right-side door lock device 220-DR was originally locked, it becomes unlocked upon activation of the actuator 202-DR.

Similarly, when the manual switch 210-DL is closed to operate the left-side door lock device, the antenna 214-DL or 215-DL receives sends the code signal SC from the transmitter 100 and feeds same to the microprocessor via the switching circuit 231 and the demodulator 230. If the input code matches the preset code, the AND gate 226-DL opens to activate the driver signal generator 204-DL. Thus, if the left-side door lock device is originally unlocked, it becomes locked.

When the manual switch 210-TL is operated, the timer 222-TL become active to send a timer signal St to the AND gate 226-TL and the switching elements 228-TL and 229-TL. The switching circuit 228-TL then closes to established electrical communication between the antenna 214-TL or 215-TL and the demodulator 230 and the modulator 238. The code signal SC is transmitted from the transmitter 100 to the antenna 214-TL or 215-TL in response to the deaden signal SD. If the input code is the same as the preset code, then the AND gate 226-TL opens to activate the driver signal generator 204-TL. Therefore, the trunk lid lock device 220-TL switches from its current position to the other position.

When the manual switch 210-GL is operated to open the glove box lid, the timer 222-GL is activated to output the timer signal St. In response to the timer signal St, the switching elements 228-GL and 229-GL establishes electrical communication between the antenna 214-GL and the demodulator 230. The code signal SC transmitted from the transmitter 100 is thus demodulated by the demodulator and input to the microprocessor 232. The AND gate 226-GL opens in response to the control signal SL from the microprocessor 232 to activate the driver signal generator 204-GL by the gate signal thereof. In response to the driver signal from the driver signal generator 204-GL, the actuator 202-GL become active to reverse the position of the glove box lid lock from locked state to the unlocked state to allow access to the glove box.

In order to release the steering wheel from the locked state, the manual switch 210-ST is depressed. The timer 222-ST becomes active to output the timer signal St for the given period of time. During the period of time in which the timer 222-ST is active, the antenna 214-ST or 215-ST is connected to the microprocessor 232 via the demodulator 230 to receive the code signal SC from the transmitter 100. When the input code matches the preset code in the memory 236, the driver signal generator 204-ST outputs the driver signal to reverse the position of the steering lock device 220-ST from the locked state to the unlocked state.

Figure 8:
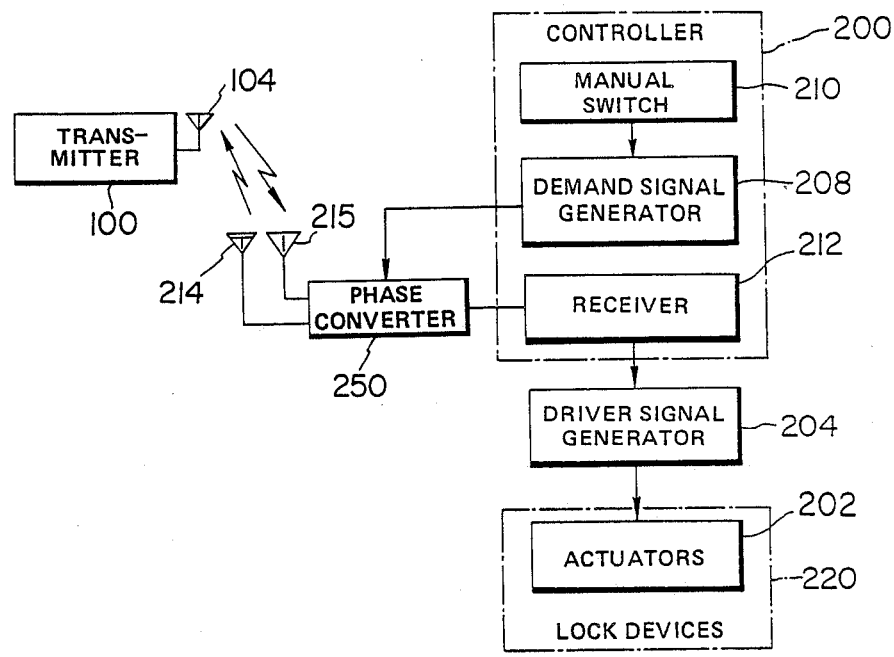
FIG. 8 is a block diagram of a modification of the first embodiment of the keyless entry system of FIG. 1.

FIG. 8 shows the second embodiment of a keyless entry system according to the present invention. Similarly to the foregoing first embodiment, the controller 200 is provided with pairs of antennas 214 and 215 arranged perpendicular to each other. The antennas 214 and 215 are connected to the receiver 212 through a phase converter 250. The phase converter 250 is adapted to shift the phase of code signals received via the antennas 214 and 215 through 90°. The phase converter 250 mixes the phase-shifted code signals and sends the mixed code signal to the demodulator. The phase converter 250 is also adapted to feed the demand signal SD to the antennas 214 and 215 at phases 90° apart.

Assuming the distance between the transmitter 100 and the controller 200 is shorter than the wavelength of the carrier of the demand signal SD and the code signal SC, so that the signal phase will not shift significantly in that distance, the field strength induced at the antenna 104 of the transmitter 100 can be described by the following equation:

$$E = E_1 \cos \omega t + E_2 \sin \omega t$$
$$= E_1^2 + E_2^2 \times \sin(\omega t - \phi)$$

where $E_1 \cos \omega t$ is the field component at the antenna 104 due to the demand signal transmitted through the antenna 214; $E_2 \sin \omega t$ is the field component at the antenna 104 due to the demand signal transmitted through the antenna 215.

As will be apparent from the above equation, the field strength at the antenna 104 equal to the vector sum of the strengths of the code signals transmitted from the antennas 214 and 215 is greater than either of the charges $E_1$ and $E_2$ applied to respectively antennas 214 and 215 independently.

Therefore, even if one of the antennas 214 and should be perpendicular to the antenna 104 of the transmitter, clear reception can be ensured.

Figure 9:
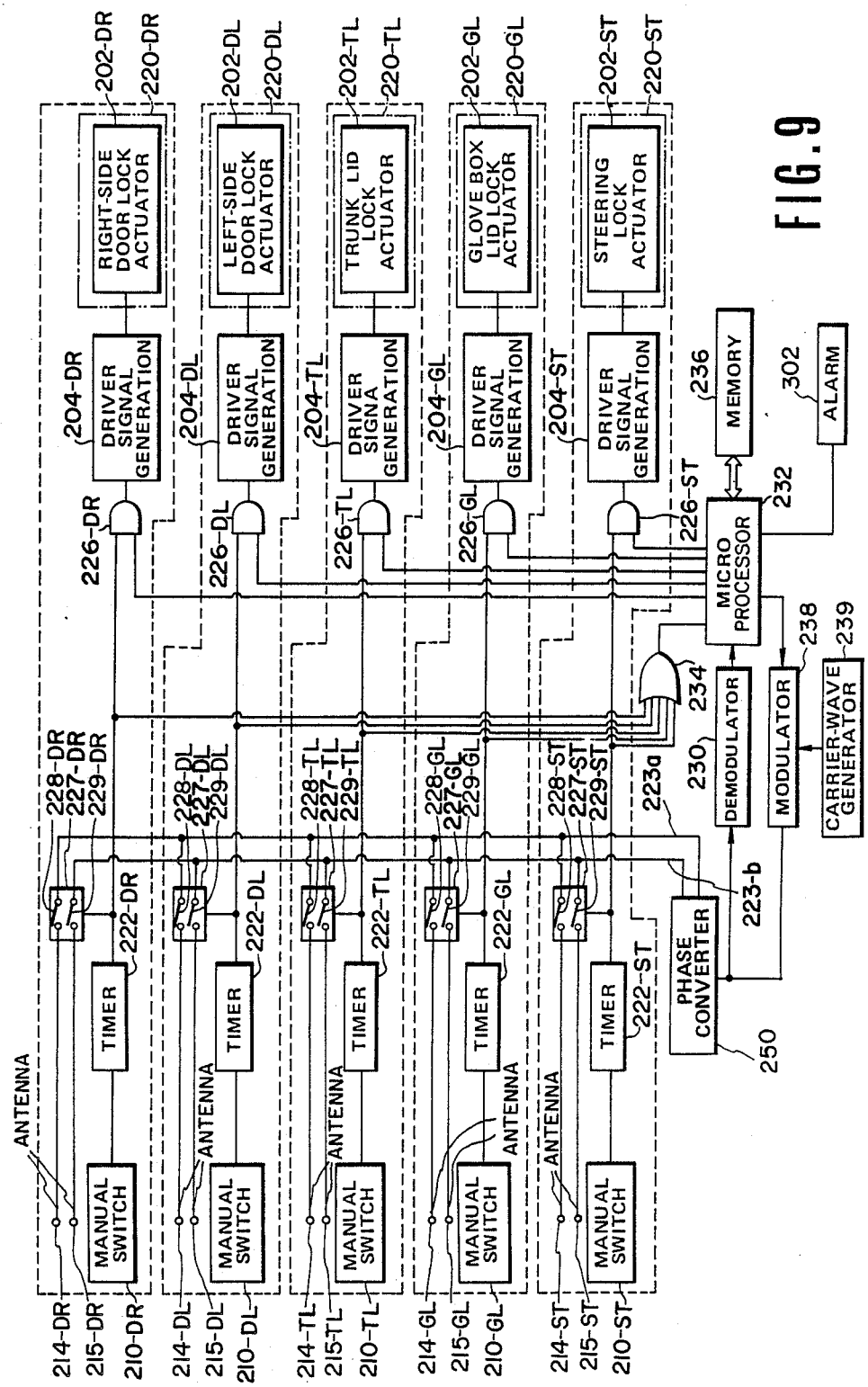
FIG. 9 is a block diagram of the second embodiment of a controller.

FIG. 9 shows the detailed circuitry of the controller of the second embodiment of the keyless entry system according to the present invention. In this embodiment, similarly to the aforementioned first embodiment, a plurality of loop antennas 214-DR, 214-DL, 214-TL, 214-GL and 214-ST are provided on the side window surface and a plurality of loop antennas 215-DR, 215-DL, 215-TL, 215-GL and 215-ST are provided on the door mirror surface.

The antennas 214-DR and 215-DR are associated with the right-side door lock device 220-DR. The antennas 214-DL and 215-DL are associated with the left-side door lock device 220-DL. Similarly, the antennas 214-TL and 215-TL correspond to the trunk lid lock device 220-TL, the antennas 214-GL and 215-GL correspond to the glove box lid lock device 220-GL, and the antenna 214-ST and 215-ST correspond to the steering lock device 220-ST. Each pair of antennas 214 and 215 are connected to the demodulator 230 and the modulator 238 through the phase converter 250.

The microprocessor 232 receives the code signal SC through the demodulator 230 and outputs the demand signal SD. The modulator 238 modulates the demand-indicative signal from the microprocessor with the carrier-wave from the carrier-wave generator 239.

As will be appreciated herefrom, according to the present invention, the user is now free of the responsibility of memorizing the preset code and need only depress a manual switch corresponding to the desired lock device to be operated. In addition, since the keyless entry system has dual-antenna system, data transmission between the transmitter and the controller is ensured.

Therefore, the present invention fulfills all of the objects and advantages sought therefor.

What is claimed is:

1. A keyless entry system for an automotive vehicle for operating one of a plurality of vehicle devices including a door lock device which is selectively operated to either of a first locked position and a second unlocked position, comprising:
   a plurality of electrical actuators respectively associated with the corresponding vehicle devices and responsive to a control signal to operate said corresponding vehicle device to desired position, which includes a door lock actuator for operating said door lock device between said first locked position and said second unlocked position;
   a plurality of manual switches, each operating one of the corresponding vehicle devices;
   a transmitter outputting a radio signal indicative of a unique code which identifies the transmitter when one of said manual switches is manually operated;
   a first antenna associated with said transmitter for transmitting said ratio signal therethrough;
   a controller for receiving said radio signal from said transmitter, comparing the unique code indicated by said radio signal with a preset code, and producing said control signal when said unique code matches said preset code, said controller including means responsive to manual operation of said one of said manual switches for identifying one of said actuators to be operated and operating said identified actuator for operating one of the vehicle devices corresponding to the manual switch operated; and
   a plurality of sets of second and third antennas, each set corresponding to each of said manual switches and each set connected to said controller for receiving said radio signal therethrough when one of said manual switches corresponding thereto is operated, said each set of second and third antennas being oriented perpendicular to each other, in which said second antenna of a given pair corresponding to said door lock actuator is mounted on a vehicular side door window and said third antenna of said given pair is mounted on a reflector surface of a vehicular door mirror, which reflector surface extends substantially perpendicular to said vehicular side door window.

2. The keyless entry system as set forth in claim 1, wherein said transmitter is portable and said controller is mounted on a vehicle and connected to said manual switches, said controller responsive to operation of one of said manual switches to produce a demand radio signal, said transmitter receiving said demand radio signal for outputting said unique code-indicative radio signal.

3. The keyless entry system as set forth in claim 2, wherein said controller further comprises means for identifying one of the devices corresponding to one of the switch elements operated.

4. The keyless entry system as set forth in claim 3, wherein each of said pairs of said second and third antennas are connected to the controller through a switching circuit which selectively connects said second and third antennas to said controller.

5. The keyless entry system as set forth in claim 4, wherein said switching circuit changes switch position between a first position in which each said second antenna is connected to said controller and a second position in which each said third antenna is connected to said controller, said switching circuit responsive to a periodic switching signal from said controller to alternate between said first and second switch positions.

6. The keyless entry system as set forth in claim 3, wherein each of said second and third antennas are connected to said controller through a phase converter which shifts the phase of radio signals received through each of said second and third antennas through approximately 90°, mixes the received and shifted signals, and outputs the mixed radio signal to the controller.

* * * * *